(12) United States Patent
Anxionnaz et al.

(10) Patent No.: US 7,062,072 B2
(45) Date of Patent: *Jun. 13, 2006

(54) METHODS OF PRODUCING IMAGES OF UNDERGROUND FORMATIONS SURROUNDING A BOREHOLE

(75) Inventors: Hervé Anxionnaz, Chatillon (FR); Jean-Pierre Delhomme, Boulogne Billancourt (FR); Raghu Ramamoorthy, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/412,175

(22) Filed: Apr. 11, 2003

(65) Prior Publication Data

US 2003/0223620 A1 Dec. 4, 2003

Related U.S. Application Data

(63) Continuation-in-part of application No. 09/470,435, filed on Dec. 22, 1999, now Pat. No. 6,704,436, and a continuation-in-part of application No. 09/621,473, filed on Jul. 21, 2000, now abandoned.

(51) Int. Cl.
*G06K 9/00* (2006.01)

(52) U.S. Cl. ............... 382/109; 73/152.01; 348/85; 356/241.1; 367/35; 367/86; 702/7

(58) Field of Classification Search ............... 382/109; 73/152.01; 348/85
See application file for complete search history.

(56) References Cited

U.S. PATENT DOCUMENTS 3,668,619 A * 6/1972 Dennis .................... 367/69

(Continued)

FOREIGN PATENT DOCUMENTS

EP 1070970 A1 * 1/2001

OTHER PUBLICATIONS

Geomodeling Technology Group, SBED—A Bridge to Link Geology, Geophysics and Reservoir Engineering—brochure available at http://www.geomodeling.com/sbed.htm, May 11, 2002.

(Continued)

*Primary Examiner*—Samir Ahmed
*Assistant Examiner*—Anand Bhatnagar
(74) *Attorney, Agent, or Firm*—Victor H. Segura; Brigitte L. Echols

(57) ABSTRACT

A method of producing images of formations surrounding a borehole, comprises: obtaining values of a first parameter in the borehole as a function of depth and azimuth at a first resolution; obtaining values of a second parameter in the borehole as a function of depth only at a second resolution; establishing a relationship between the first and second parameters at a matched resolution; using the relationship to derive values of the second parameter as a function of depth and azimuth; and producing an image of the second parameter as a function of depth and azimuth using the derived values of the second parameter. A method of producing three dimensional images comprises obtaining values of a first parameter in the borehole as a function of depth and azimuth at a first resolution; obtaining values of a second parameter in the borehole as a function of depth only at a second resolution; establishing a relationship between the first and second parameters at a matched resolution; using the relationship to derive values of the second parameter in a three dimensional array; and producing an image of the second parameter in three dimensions using the derived values of the second parameter.

24 Claims, 5 Drawing Sheets

U.S. PATENT DOCUMENTS

| | | | | |
|---|---|---|---|---|
| 5,335,542 A | * | 8/1994 | Ramakrishnan et al. | 73/152.08 |
| 5,442,294 A | * | 8/1995 | Rorden | 324/339 |
| 5,519,668 A | * | 5/1996 | Montaron | 367/35 |
| 5,862,513 A | * | 1/1999 | Mezzatesta et al. | 702/9 |
| 6,023,168 A | * | 2/2000 | Minerbo | 324/373 |
| 6,125,203 A | * | 9/2000 | Keskes et al. | 382/171 |

OTHER PUBLICATIONS

H Anxionnaz & J.P Delhomme, Near–Wellbore 3D Reconstruction Of Sedimentary Bodies From Borehole Electrical Images, SPLWA 39th Annual Logging Symposium, May 26–29, 1998.

* cited by examiner

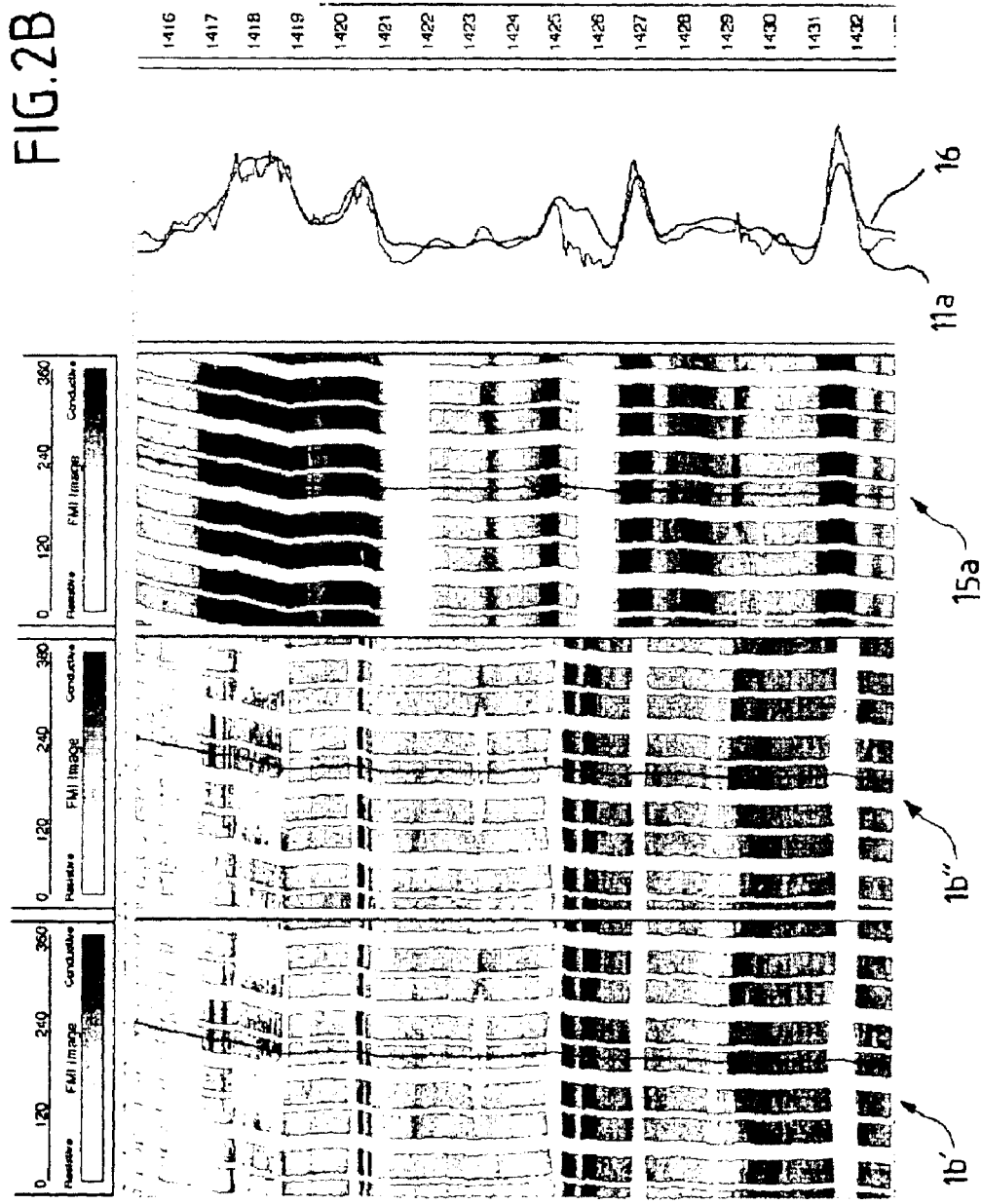

METHODS OF PRODUCING IMAGES OF UNDERGROUND FORMATIONS SURROUNDING A BOREHOLE

CROSS-REFERENCE TO RELATED APPLICATIONS

The present application is a continuation-in-part of U.S. Ser. No. 09/470,435 filed Dec. 22, 1999, now U.S. Pat. No. 6,704,436 and U.S. Ser. No. 09/621,473, filed Jul. 21, 2000 now abandoned, the contents of which are incorporated herein by reference.

FIELD OF THE INVENTION

The present invention relates to methods of producing images of underground formation surrounding a borehole such as an oil, gas or water well, or the like. In particular, the invention relates to the use of such methods to produce images in two or more dimensions.

BACKGROUND OF THE INVENTION

It is known that images of certain physical properties of underground formations can be produced as images developed over the wall of the borehole, i.e. the cylindrical surface is presented as a two-dimensional "flat" image. In order to produce such images, it has been necessary to make measurements that are resolved in both depth and azimuth on the surface of the borehole. These measurements can be used to create image pixels that present the different values of the measured property as a variation in color or shade.

There are various properties which can be measured and various ways in which such measurements can be made in order to provide the depth and azimuthally resolved measurements needed to construct the image. For example, where the measured property of the formation is its electrical resistivity, measurements can be made using pads carrying button electrodes in an array that ensure that overlapping portions of the borehole are covered as the tool is logged up the well. An example of this is the FMI tool of Schlumberger (see U.S. Pat. No. 4,4468,623 and U.S. Pat. No. 4,567,759). Another property that has been measured is the acoustic impedance, which can be done by scanning an ultrasonic beam circumferentially in the well as the tool is logged up the well. An example of this is the UBI tool of Schlumberger (see U.S. Pat. No. 4,255,798). There are other properties that can be measured and techniques for measuring them that results in the same set of depth and azimuthally resolved data.

There are certain properties that to date cannot be determined in terms of azimuth, or certain tools that cannot provide azimuthal resolution of measurements. Such measurements give a single value for that property at a given depth in the well. This results in a classic log output with a varying magnitude of the property in question plotted against depth in the well. Examples of such depth-only measurements are the measurement of density or of photoelectric factor of the formation, of permeability as obtained from a nuclear magnetic resonance measuring device, or dielectric constant or wave attenuation, as recorded by means of an electromagnetic propagation measuring tool. In each case, measuring devices are mounted on a tool having pads that are applied to the wall of the borehole in a given direction, and they therefore deliver for each depth increment, a value for the physical magnitude in question, as measured only in that direction. Such measurements suffer inherently from lack of coverage as a function of azimuth, which constitutes a limitation in formations that are heterogeneous, e.g. of the nodular, lenticular, conglomerated, fractured, or crossbedded type.

Other properties of formations that are typically only presented in depth-resolved form are qualitative indicators of formation type, such as lithofacies. Such properties or indicators are often derived from analysis of one or more measured properties and can be used to assist in interpretation of the formation structure and properties.

"Near-wellbore 3D reconstruction of sedimentary bodies from borehole electrical image" published by H. Anxionnaz and J. P. Delhomme, Transactions of the 38th annual symposium of the SPWLA (1998), discloses a method of reconstructing a physical magnitude three-dimensionally in the surroundings of a borehole from a two-dimensional image of formation resistivity as developed over the wall of the borehole obtained using an FMI type tool which produces an image having resolution of centimeter order.

It is an object of the present invention to provide a method that allows the production of images in two dimensions or above of formation properties that are normally measured only as a function of depth in a borehole.

SUMMARY OF THE INVENTION

One aspect of the present invention provides a method of producing images of formations surrounding a borehole, comprising:

obtaining values of a first parameter in the borehole as a function of depth and azimuth at a first resolution;

obtaining values of a second parameter in the borehole as a function of depth only at a second resolution;

establishing a relationship between the first and second parameters at a matched resolution;

using the relationship to derive values of the second parameter as a function of depth and azimuth; and producing an image of the second parameter as a function of depth and azimuth using the derived values of the second parameter.

In one embodiment of the invention, the image comprises a developed, two-dimensional image of at least part of the borehole wall. By obtaining values of the first parameter with substantially complete azimuthal coverage of the borehole, it is possible to produce an image of the second parameter with substantially complete azimuthal coverage of the borehole wall.

The established relationship preferably matches the resolution of the parameters such that the resolution of the derived values of the second parameter is optimized. Ideally the resolution is as high as possible. Where the first parameter has a higher resolution than the second parameter, it is preferred to match the resolution of the derived values to that of the first parameter (or vice versa). Alternatively, the relationship can be established to provide the derived values at the resolution of the second parameter only.

The step of establishing the relationship between the first and second parameters is typically accomplished by establishing a relationship between values of the first parameter as a function of depth only and the values of the second parameter, that are available only as a function of depth. This relationship is then applied to the values as a function of both depth and azimuth to derive the values of the second parameter.

A particularly preferred aspect of the invention comprises obtaining values of a first parameter in the borehole as a function of depth and azimuth at a first resolution;

obtaining values of a second parameter in the borehole as a function of depth only at a second resolution;

establishing a relationship between the first and second parameters at a matched resolution;

using the relationship to derive values of the second parameter in a three dimensional array; and producing an image of the second parameter in three dimensions using the derived values of the second parameter.

This method preferably comprises establishing a further relationship that determines a three dimensional distribution of parameter values from a predetermined set of parameter values in azimuth and depth. In one embodiment, the further relationship determines a three dimensional distribution of the first parameter based on the values of the first parameter obtained as a function of depth and azimuth. To derive the values of the second parameter in a three dimensional array, the established relationship between the first and second parameters at matched resolution is applied to the three dimensional distribution of the first parameter obtained from the further relationship. In a second embodiment, the established relationship between the first and second parameters at a matched relationship is used to derive values of the second parameter as a function of depth and azimuth, and the further relationship is used to obtain a three dimensional distribution of the second parameter based on the derived values of the second parameter as a function of depth and azimuth.

Preferably, the step of establishing a relationship between the first and second parameters at a matched resolution comprises establishing the relationship in compliance with values of at least one auxiliary parameter. The values of the auxiliary physical magnitude are preferably obtained as a function of depth and integrated over at least one azimuth range.

One convenient method of applying the relationships is by use of a trained artificial neural network. Another is the application of Bayesian classification techniques.

The first parameter is typically a property of the formation measured in the borehole, such as resistivity (conductivity), or acoustic impedance. The second and auxiliary parameters can also be properties of the formation measured in the borehole, such as density or porosity derived from nuclear measurements or acoustic measurements, or permeability derived from magnetic resonance measurements. As well as these measured, quantitative parameters, it is also possible to use qualitative indicators of the formation, i.e. integer index that points to an example in a list of attributes such as shaliness (typically obtained from gamma ray measurements), layer lithotypes (such as limestone, dolostone, sandstone, anhydrite, etc.), and heterogeneities (objects that do not extend across the borehole along the bedding directions, such as pyrite nodules, coal fragments, calcerous concretions, vugs, etc.).

BRIEF DESCRIPTION OF THE DRAWINGS

FIGS. 2a and 2b show log curves and images relating to the method of FIG. 1;

DETAILED DESCRIPTION OF THE INVENTION

The methods according to the present invention are based on the analysis of parameters that describe the properties of a formation surrounding a borehole. These parameters can be directly measured parameters such as resistivity/conductivity, density, porosity, permeability, etc., that are obtained by making a physical measurement of the formation using a sensor and interpreting the sensor response as an indicator of the property in question. Certain types of formation evaluation techniques are known as "imaging" techniques since they produce data that is derived as a function of both depth and azimuth allowing a two dimensional image of the borehole to be constructed for the property in question. Such techniques can involve multiple simultaneous measurements at different azimuths, scanning measurements around the periphery of the borehole, etc. Such measurements and interpretations are common in the field of formation evaluation and will not be described in detail.

As well as logs or images of the measured properties, it is also possible to use these measurements do define qualitative properties of the formation of "facies" (lithology, geometry, sedimentary structures, paleocurrent directions and fossils)

The task of rock facies classification in its broadest meaning consists in assigning a measured data sample to a particular class of rock that carries a number of characteristic parameters such as its name and description, its graphical and conventional representation, its petrophysical parameters, this list being non limitative. Conventionally and algorithmically, each class of rock is assigned an integer value that allows to recognize it and map it to a table or catalog containing such characteristics for every rock class of interest.

The classification procedures that relate a data sample (N-plet of measured values) to a class (represented by an Integer value) are either supervised procedures (based on some apriori knowledege or definition of the domain of classes), or unsupervised (based on some statistical analysis and partitioning of the space of data samples into a determined number of classes).

Supervised procedures are, for example, discrimination methods, Bayesian techniques, or supervised neural networks, all of which assume that some subset of the input measurement samples are known or recognized to belong to some given class. The classification engine is trained or designed to optimize the recognition of the classes of this subset of a priori data.

Unsupervised procedures are for example clustering, and unsupervised neural networks, for which no a priori information is required, and the classification engine is trained to optimize the partitioning of the whole set of data samples into a chosen number of classes.

The contribution of logging data to bulk rock facies classification is described in Oberto Serra and H. T. Abbott "The contribution of logging data to sedimentology and stratigraphy" SPWLA 23rd annual logging symposium.

Figure 1:
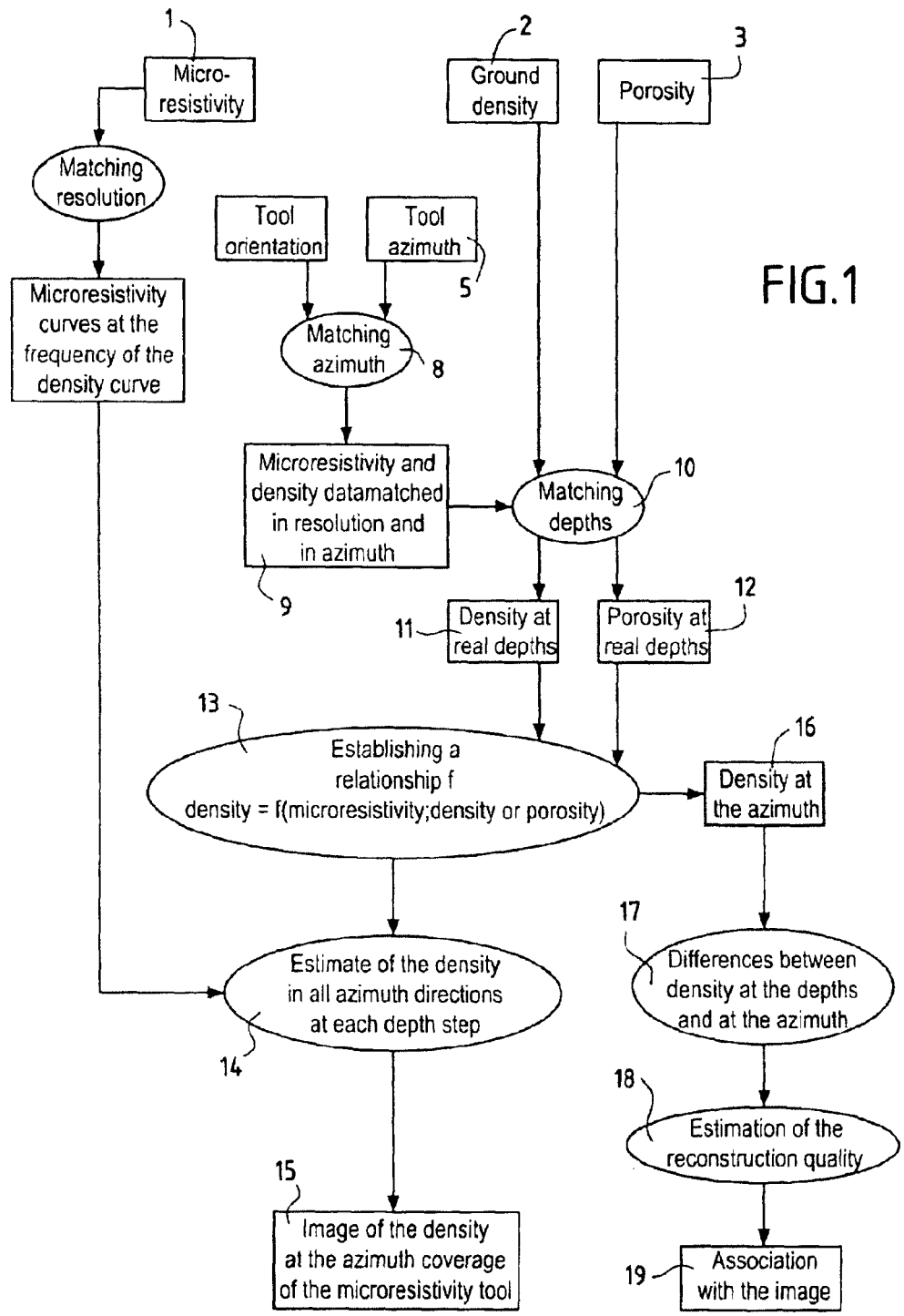
FIG. 1 shows a data flow diagram for a method according to a first embodiment of the invention.

Referring now to FIG. 1, the initial steps comprise obtaining measurements of the first parameter 1, the second parameter 2 and the auxiliary parameter 3. In this case, the first parameter is micro-resistivity such as is measured by the FMI tool described above which measures this magnitude at each depth step, e.g. every 2 mm, by using 192 sensors operating on 192 different azimuth directions. Simultaneous with the micro-resistivity measurements, the orientation of the tool is measured 4 by means of a three-axis magnetometer which supplies the direction of the Earth's magnetic field, so as to have a reference azimuth direction serving to identify the direction in which each sensor performs its measurement. It is also possible to use a three-axis accelerometer for this purpose.

Figure 2A:
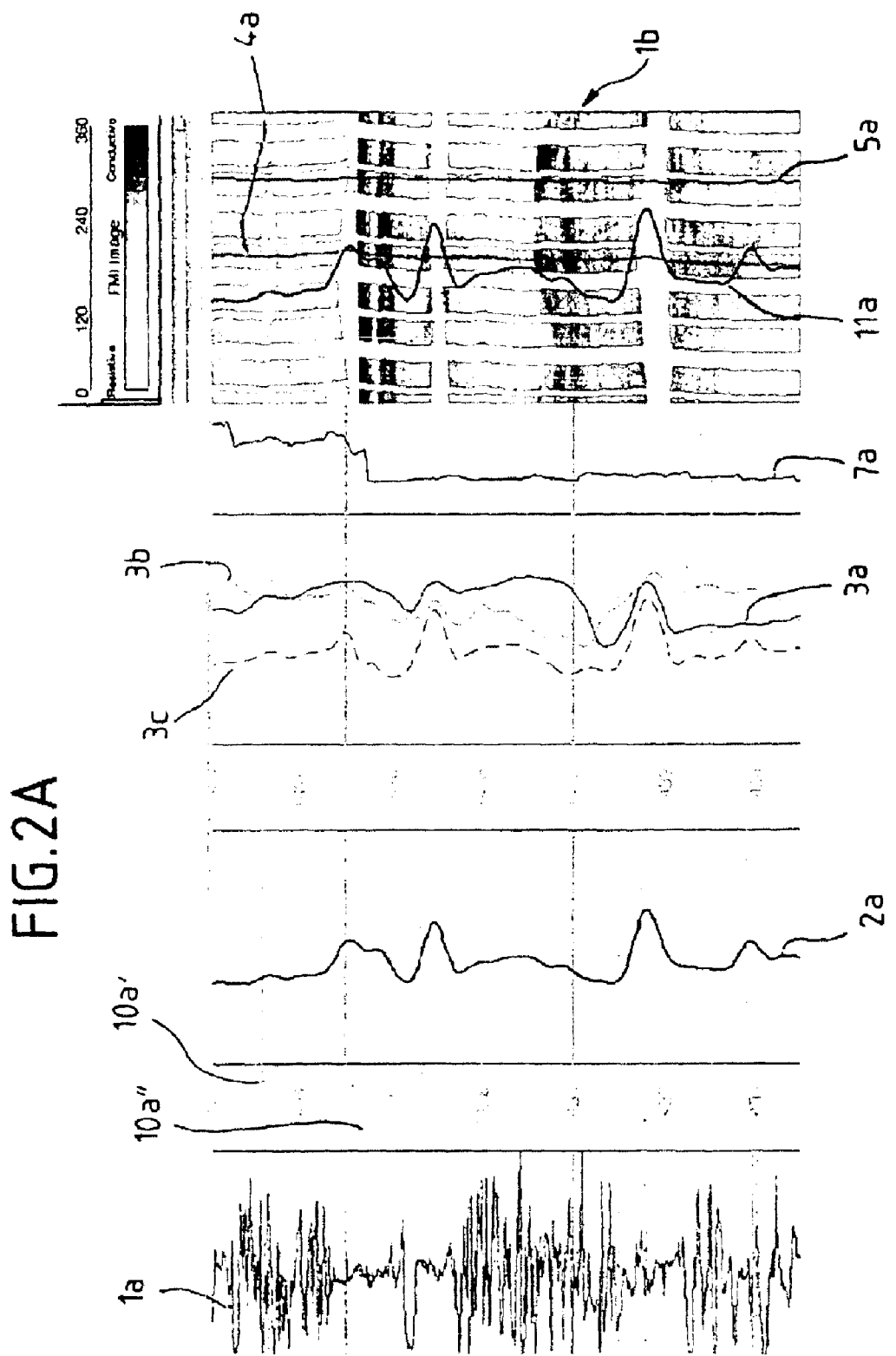

Curve 1a of FIG. 2a shows the variations in micro-resistivity as measured by one of the 192 sensors. By assigning a color or a gray-scale level to each micro-resistivity range, it is possible to obtain an image of the measured values as developed on the wall of the borehole, by representing each measurement as a color or gray-scale level pixel according to the micro-resistivity range into which it falls in a plane as a function of depth and of azimuth. One such image is given at 1b in FIG. 2a. Curve 4a of FIG. 2a shows the azimuth of a reference sensor in the set of 192 sensors as measured in step 4. This curve shows how the tool rotates as it moves in the depth direction. The white stripes in FIG. 2a parallel to curve 4a correspond to azimuth ranges in which there are no micro-resistivity sensors because of the way in which the tool is constructed. However, as will be seen, substantially all of the circumference of the borehole wall is covered by the measurements.

The second parameter is measured 2 as a function of depth only and in a single known azimuthal direction. In this case it is formation density as obtained by a gamma ray log, and is shown as curve 2a in FIG. 2a. The azimuth of the density tool is also measured 5 (FIG. 1) as a function of depth and is shown as curve 5a in FIG. 2a. This varies little, since this tool is kept oriented in relatively accurate manner by the pad which carries the sensor and which presses it against the wall of the borehole. The present invention aims to reconstruct values of this second parameter over substantially all of the borehole wall.

The auxiliary parameter measurements 3 relate to volumetric properties of the formation and are not directional. In this case, for example, porosity is measured by acoustic logging, by gamma rays, and by neutron logging, thus giving curves 3a, 3b, and 3c respectively as a function of depth in FIG. 2a.

Following acquisition of the data in 1, 2 and 3, steps are taken to make them mutually compatible. The resolution of each of the micro-resistivity curves such as 1a is matched with the resolution of the density curve 2a 6. This comprises averaging the micro-resistivity values by computation so as to obtain the carriers of the curves 1a at the fundamental frequency of the curve 2a so as to obtain curves 7 (FIG. 1) such as curve 7a in FIG. 2a, each matching one of the curves 1a, there being 192 such curves in this case.

In matching 8 (FIG. 1) the azimuths of the micro-resistivity curves 7a to the azimuth of density curve 2a, the various measurements are placed in an absolute angular frame of reference rather than referring them to the corresponding tool at the time of measurement. The azimuth curves 4a and 5a are used for this purpose. Thus two data sets are obtained 9 (FIG. 1), respectively concerning micro-resistivity and density, which are matched both in resolution and in azimuth. No azimuth matching is necessary for the auxiliary parameter since these measurements provide a value for the parameter that is taken as being integrated over an azimuth range, and generally over 360°.

The depths of the data obtained during the various prior operations and that have different depth measurement errors are matched 10 (FIG. 1). To this end, the measurements of the second and auxiliary parameters are matched to the measurements of the first parameter. This matching is performed empirically by identifying, in curves 1a and 2a on the one hand, and in curves 1a and 3a–3c on the other hand, points that correspond such as 10a', 10a", . . . . Thereafter, the various second and auxiliary parameters are given absolute depths by computation so as to make it possible to obtain 11 (FIG. 1) the density curve 11a of FIG. 2a as a function of real depth, and 12 (FIG. 1) equivalent curves (not shown) concerning the auxiliary parameters.

Thereafter, the method comprises establishing a relationship 13 (FIG. 1) between the matched secondary parameter as obtained in 11 and the primary parameter and the auxiliary parameters as obtained in 12, the relationship being of the form:

$$\text{density} = f(\text{microresistivity}_m, \text{auxiliary})$$

in which density is represented as a function of matched micro-resistivity, subject to the values of the auxiliary parameter(s), in this case porosity and natural radioactivity.

In the above equation, the variable microresistivity$_m$ is the micro-resistivity of the wall on the density measurement azimuth, and assumes that all matching operations have already been performed. This does not mean that this variable takes account only of the log actually performed on that azimuth. In general, density measurement integrates the values of this parameter over a sector that is larger than that of a single micro-resistivity measurement. Thus, account is taken of a plurality of logs made on either side of the azimuth of the density measurement, e.g. by weighted averaging of the various micro-resistivity measurements performed at given depth in the logs.

Step 13 can be implemented by processing the input data using a non-parametric multivariable regression technique. More particularly, it is possible to use an artificial neural network to which the input data constitutes a training set.

A two-layer network can be used with ten nodes per layer, together with two hidden levels, the inputs comprising:

micro-resistivity $\overline{R}$ measured in the density measurement direction, averaged and matched in azimuth and in depth;

the measured density $\rho_{dm}$; and the measured porosity $\Phi_N$ obtained by the neutron log; and the output comprising estimated density $\hat{\rho}$.

In practice, 1200 sets of measurements can be used, 600 of which enable the function f to be determined, and the other 600 serving to validate it and correct the weights of the inputs. As is common practice in geology (Walther's law), it is assumed that any accident (nodule, vacuole, . . . ) that is to be found at a given depth in an azimuth in which the second or auxiliary parameter has not been sampled, will nevertheless have been sampled at some other depth, providing the interval studied is long enough. This guarantees that the approach adopted is not open to doubt because of a non-representative training set.

It is also assumed that the auxiliary parameters carry sufficient information to take account of the portion of the spatial variability of the first parameter which is not directly associated with changes in the second parameter. This ensures the exhaustiveness that is required at the input to the artificial neural network, for example.

It will be observed that even under such circumstances it is unlikely that a one-to-one relationship can be found, given the inherent variability of natural phenomena, and given uncontrolled effects such as hole effects. The dispersion of the reconstructed values of the second parameter relative to the dispersion of the original values is analyzed statistically over the training set so as to provide an indication of the uncertainty associated with the reconstruction process, and so as to verify that the inputs are exhaustive. Once the relationship f has been obtained in this way it is applied 14

(FIG. 1) to the averaged values R̄ of the resistivity for each of the 192 sensors, so as finally to obtain an estimate of the density ρ in the 192 different azimuth directions at each depth step.

An image of the second parameter is developed over the wall of the borehole 15 (FIG. 1), possessing the same resolution in depth and in azimuth as the measurements of the second parameter, but having azimuth coverage that is the same as that of the first parameter.

The influence of the auxiliary parameter used for determining the relationship between the first and second parameters serves to ensure that the image of the second parameters does not merely reproduce the image of the first parameter but at lower resolution.

FIG. 2b shows three images, which, from left to right, comprise an image 1b' of the primary magnitude in a range of depths that is slightly smaller than 1b in FIG. 2a; an image 1b" of the same primary magnitude, but using values that have been matched for resolution in step 6; and an image 15a of the magnitude as obtained in step 15.

Curve 11a of FIG. 2a corresponds to density as measured and adapted, together with curve 16a corresponding to density as calculated in step 16 (FIG. 1) at the same azimuth by using the relationship f. The differences between the curves 11a and 16 are then analyzed 17 (FIG. 1), using the least squares method. The result makes it possible to estimate 18 (FIG. 1) the quality of the reconstruction, since, for given azimuth, the reconstructed values of the second parameter have been compared with the values of the parameter is measured. This estimate is associated 19 (FIG. 1) with the reconstructed image 15a. Iteration also makes it possible to optimize the reconstruction model by maximizing the criterion constituted by the above-specified estimate.

This method of the invention thus provides not only the desired image of the second parameter, but also a criterion concerning the quality of said image and means for optimizing it.

Various changes can be made to this method of producing the image. For example, when establishing the relationship between the first and second parameters, it is possible to provide the derived values for the second parameter at the resolution of the first parameter. This is advantageous when the first parameter has sufficient resolution to show structural features no apparent at that of the second parameter. In order to achieve this, effective calibration of the relationship is required, possibly using external data. Also, while the example given above uses measured data as the second and auxiliary parameters, one or both of these can be replaced by qualitative parameters such as lithotypes or heterogeneities.

Figure 3:
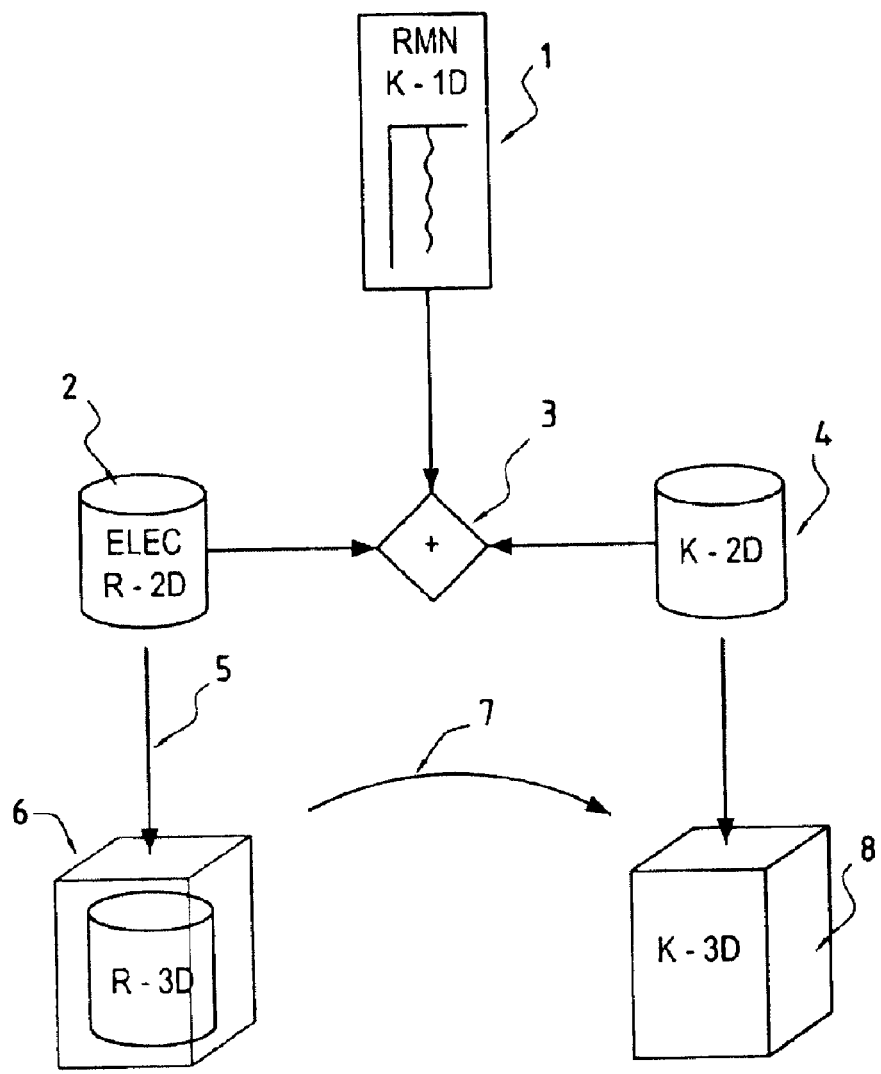
FIG. 3 shows the major stages of a method according to a second embodiment of the invention.

Referring now to FIG. 3, there is shown therein the basic data of a method according to a second aspect of the invention for producing three dimensional images of the second parameter. As with the previous example, this method begins with logs of the first and second parameters. In this case, however, the log 1 of the second parameter is a log RMN K-1D of permeability obtained by magnetic resonance measurements such as are obtained by the CMR tool of Schlumberger. As with the previous example of density, this measurement is made on one azimuth only. The log of the first parameter 2 is again a micro-resitivity log ELEC R-2D as described above. Determination of azimuthal directions is achieved as in the previous example.

A relationship 3 is established between the two datasets in the manner described above to derive values K-2D of the second parameter in terms of both azimuth and depth 4.

A further relationship 5 is established which results in a three-dimensional distribution of values of the first parameter. For this purpose, it is possible to use the method described in the above-mentioned article "Near-wellbore 3D reconstruction of sedimentary bodies from borehole electrical images". The resulting three dimensional distribution defines formation structural features in and around the borehole.

A three dimensional image 8 K-3D of the second parameter is obtained by applying 7 the depth and azimuth values 4 of the second parameter to the three dimensional structure 6 obtained from the first parameter.

It is also possible to obtain the three-dimensional image 8 of the second parameter from its derived azimuthal and depth data 4 in the same manner as is done for the three-dimensional image 6 of the first parameter, namely by establishing the further relationship on the basis of the derived second parameter data to provide a resulting image of the structural features. However, the sequential application of two relationships to the second parameter data can result in problems of resolution in the final image with the possibility of structural features in the final image becoming blurred or being omitted entirely.

Figure 4:
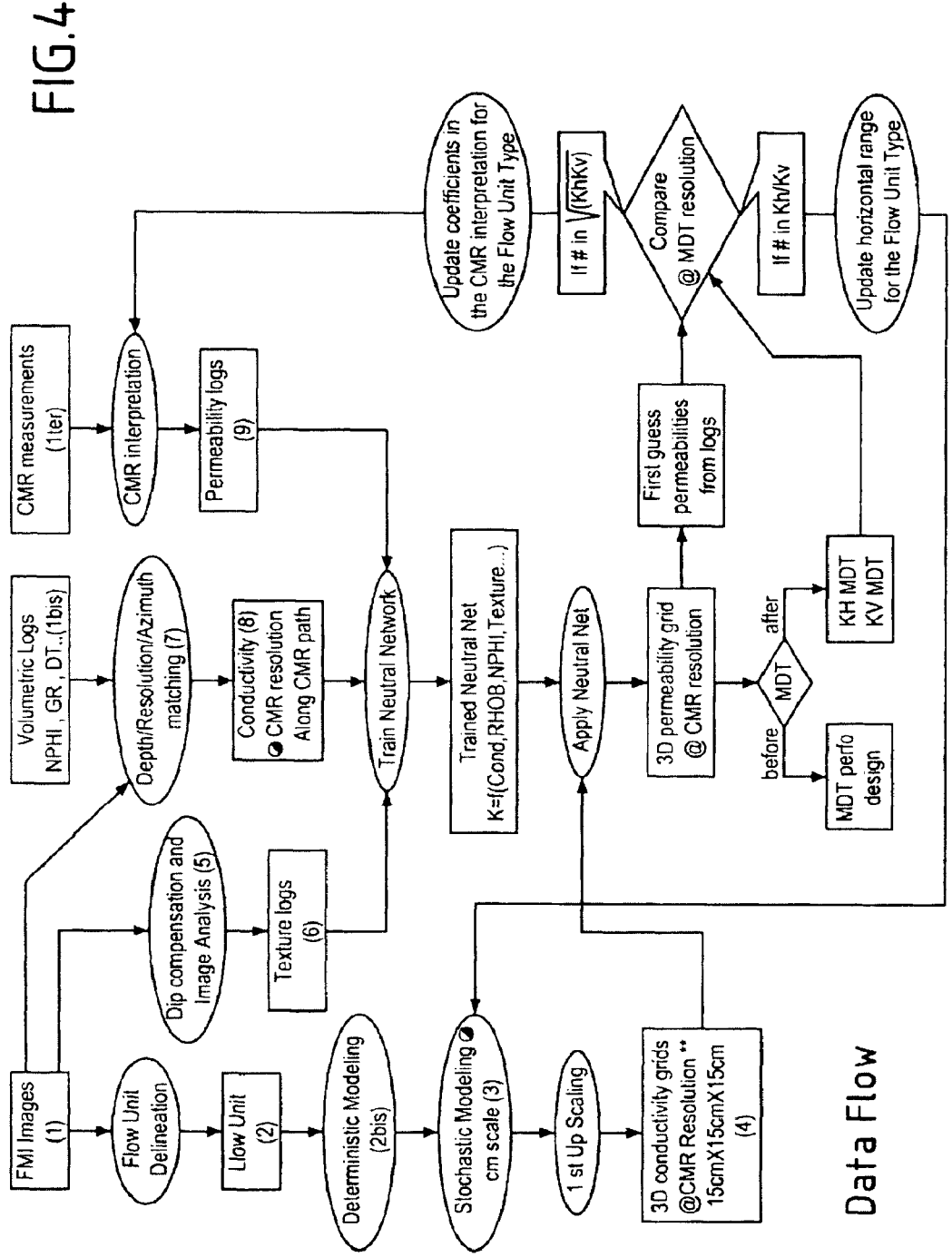
FIG. 4 shows a more detailed data flow diagram of the method of FIG. 3.

Further detail of this method is described below in greater detail with reference to FIG. 4. In this case the method is described in the context of producing an image of permeability data obtained from log measurements that assists in designing a formation sampling logging procedure based on direct measurement of the formation permeability such as can be obtained using the MDT tool of Schlumberger. The object is to obtain a log-based image that has comparable resolution to that obtained by the sampling tool.

The initial data are micro-resistivity FMI images 1 as a first parameter, a series of volumetric log measurements such as neutron porosity NPHI, gamma ray GR, sonic slowness DT, density RHOB, etc. as auxiliary parameters 1 bis, and magnetic resonance CMR measurements 1 ter as a second parameter.

Starting from the developed two-dimensional image 1 of the electrical conductivity of the formation surrounding the borehole, as obtained by FMI imaging, the first step comprises delineation so as to define flow units 2. A flow unit is defined as a geological unit liable to have flow properties that are coherent. Sedimentary structures deposited under the same transport conditions generally present particular geometrical characteristics associated with sediment transport direction. Structures deposited under different transport conditions give rise to a different flow units. Definition of such structures and of flow units is well known and will not be described in detail here.

Three-dimensional reconstruction of the shapes of the defined sedimentary structures around the borehole by deterministic modeling 2 bis in the manner described in the above-specified article "Near-wellbore 3D reconstruction of sedimentary bodies from borehole electrical images" is performed. The deterministic modeling of the shapes of sedimentary structures based on dip data derived from the FMI image of the borehole contribute to discovering the directions of local aniosotropy in the three-dimensional distribution of conductivity (along and across the strata)

Stochastic modeling 3 to simulate a three-dimensional distribution of electrical conductivity in the vicinity of the borehole is guided using the results of the deterministic modeling. For each flow unit, the variation in three dimensions of electrical conductivity is initially characterized on the basis of the FMI data by means of a correlation function (i.e. by means of a variogram), after a logarithmic transform has been applied to the FMI data so as to compensate for its distribution, being log-normal in the statistical sense. The correlation function is calculated both in the direction of the stratification and across it, and normally, it differs from one flow unit to the next. The correlation functions calculated for each flow unit are then used to perform conditional stochastic simulation of electrical conductivity around the borehole to satisfy simultaneously the shape of the deposits as obtained in the deterministic modeling step 2 bis, and the conductivity data as recorded from the wall of the borehole.

The simulation is performed for each point in three dimensions by using a correlation function with specific directions of aniosotropy as deduced from the deterministic model 2 bis, and by using a specific anisotropy ratio deduced from analyzing the directional correlation. In order to provide a first change of scale so as to come closer to the resolution of a nuclear magnetic resonance CMR tool, a first up scaling is performed to simulate the distribution of the geometrical mean of electrical conductivity in 15 cm×15 cm×15 cm cells 4.

Initially, in the deterministic modeling step 2bis, the values of a certain number of geometrical parameters (angles, distances, ... ) are determined point by point within a certain volume around the borehole so as to satisfy the dip data at the wall of the borehole as obtained by the conductivity measurements. This determination can be performed in the manner described in Appendix A of the above-mentioned article. Thereafter, in the stochastic modeling step 3, variation in electrical conductivity at the wall of the borehole is determined initially both along and across the dip. This conductivity data is then exported to the entire volume surrounding the borehole, taking account of the variations in the parameters as determined in the deterministic modeling step 2 bis. Appendix B of the above-mentioned article describes an algorithm enabling this to be performed. The result of these preceding steps is a three-dimensional electrical conductivity grid 4 made up of cube-shaped cells of side equal to 15 cm and describing a parallelepiped of 1 m×1 m×N m centered on the axis of the borehole.

Dip compensation and image analysis 5 is applied to the FMI images 1 to provide texture logs 9. These texture logs 9 contain additional information which is necessary for establishing the best relationship between permeability and electrical conductivity. A method of establishing such a relationship is described in French patent application No. 98 16614.

In addition to the two-dimensional resistivity image 1, auxiliary parameters 1bis are also available for establishing this relationship.

Given the azimuth of the CMR measurement (known from the logging operation), depth, resolution and azimuth matching 7 are applied to the FMI image 1 to derive a conductivity curve 8 at the resolution of the CMR measurements, in alignment with the azimuth of the CMR measurements. During this step, the volumetric logs 1 bis of the auxiliary parameters are also accurately aligned in depth with the permeability curve deduced from the nuclear magnetic resonance measurements and with the conductivity curve that is matched in resolution and azimuth as deduced from the FMI images.

An artificial neural network is trained using the FMI images 1, texture logs 6, matched conductivity and auxiliary curves 7 and permeability logs 9 (obtained from interpretation of the CMR measurements 1 ter) to provide a trained neural net that establishes a relationship between the permeability deduced from the CMR measurements and the electrical conductivity deduced from the FMI measurements, in compliance with volumetric logs of gamma ray porosity and of transit time, etc. and, optionally, with texture logs deduced from images of the borehole when available.

The three-dimensional electrical conductivity grid 4 is then converted into a permeability grid. To this end, the above-mentioned relationship obtained by means of the artificial neural network is applied to each cell of the three-dimensional conductivity grid 4 so as to deduce a three-dimensional permeability grid at the resolution of the CMR measurements.

The permeability grid can be used to design a campaign of downhole tests by means of a formation test tool (such as Schlumberger's MDT), by making an a priori model of fluid flow based on the three-dimensional permeability grid. Use of the tool can thus be optimized.

The result can also be used to compare horizontal and vertical permeability data $K_h$ and $K_v$ obtained by an MDT test (at meter scale) with first guess permeability information supplied by the logging images (at centimeter scale) and with the permeabilities obtained by means of the invention using nuclear magnetic resonance (at decimeter scale).

When the values of anisotropy ($K_h/K_v$) differ from one type of data to another, the aniostropy parameters of the stochastic model 3 are modified by updating the horizontal range for that flow unit type when the values of $[K_h*K_v]^{1/2}$ differ from one type of data to another, the coefficients in the formulae for interpreting the magnetic resonance data can be updated form that flow unit type. More specifically, the coefficient C of Kenyon's formula is adjusted, e.g. as given in the article "Nuclear magnetic resonance imaging— technology for the 21st century", published by B. Kenyon and G. Gubelin, in the journal Oilfield Review, Autumn 1995.

As has been mentioned above, instead of deriving a conductivity grid based on the FMI (first parameter) image, azimuthal and depth values of the second parameter derived according to the embodiment of the invention described in relation to FIGS. 1 and 2 above can be used. In this approach, the method described in FIGS. 1 and 2 is followed by adopting the methodology described in the article "Near-wellbore 3D reconstruction of sedimentary bodies from borehole electrical images" and applying it to the derived values of the second parameter. The applicability of this approach will depend on the resolution that can be obtained form the derived values of the second parameter. Where the initial values of the second parameter has relatively high resolution, this method can be used. Where the resolution is relatively low, the further loss in resolution might make this approach less attractive.

While this method has been described in relation to a measured second parameter, it can equally be applied to a derived qualitative parameter. Likewise the auxiliary parameters can include such qualitative indicators.

What is claimed is:

1. A method of producing images of formations surrounding a borehole, comprising:
    obtaining values of a first parameter in the borehole as a function of depth and azimuth at a first resolution;
    obtaining values of a second parameter in the borehole as a function of depth only at a second resolution;
    establishing a relationship between the first and second parameters at a matched resolution;
    using the relationship to derive values of the second parameter as a function of depth and azimuth; and
    producing an image of the second parameter as a function of depth and azimuth using the derived values of the second parameter.

2. A method as claimed in claim 1, wherein the image comprises a developed, two-dimensional image of at least part of the borehole wall.

3. A method as claimed in claim 2, comprising obtaining values of the first parameter with substantially complete azimuthal coverage of the borehole.

4. A method as claimed in claim 3, comprising producing an image of the second parameter with substantially complete azimuthal coverage of the borehole wall.

5. A method as claimed in claim 1, wherein the established relationship matches the resolution of the parameters such that the resolution of the derived values of the second parameter is that of the obtained values of the second parameter.

6. A method as claimed in claim 1, wherein the established relationship matches the resolution of the parameters such that the resolution of the derived values of the second parameter is that of the obtained values of the first parameter.

7. A method as claimed in claim 1, wherein step of establishing the relationship between the first and second parameters comprises establishing a relationship between values of the first parameter as a function of depth only and the values of the second parameter.

8. A method as claimed in claim 1, further comprising establishing the relationship in compliance with values of at least one auxiliary parameter.

9. A method as claimed in claim 8, wherein the obtained values of the auxiliary parameter are measured indicators of the formation properties.

10. A method as claimed in claim 8, wherein the obtained values of the auxiliary parameter are qualitative indicators of the formation properties.

11. A method as claimed in claim 1, wherein the obtained values of the second parameter are measured indicators of the formation properties.

12. A method as claimed in claim 1, wherein the obtained values of the second parameter are qualitative indicators of the formation properties.

13. A method as claimed in claim 1, comprising applying the established relationship by means of a neural network.

14. A method of producing images of formations surrounding a borehole, comprising:

obtaining values of a first parameter in the borehole as a function of depth and azimuth at a first resolution;

obtaining values of a second parameter in the borehole as a function of depth only at a second resolution;

establishing a relationship between the first and second parameters at a matched resolution;

using the relationship to derive values of the second parameter in a three dimensional array; and producing an image of the second parameter in three dimensions using the derived values of the second parameter.

15. A method as claimed in claim 14, further comprising establishing a further relationship that determines a three dimensional distribution of parameter values from a predetermined set of parameter values in azimuth and depth.

16. A method as claimed in claim 15, wherein the further relationship determines a three dimensional distribution of the first parameter based on the values of the first parameter obtained as a function of depth and azimuth.

17. A method as claimed in claim 16, comprising applying the established relationship between the first and second parameters at matched resolution to the three dimensional distribution of the first parameter obtained from the further relationship.

18. A method as claimed in claim 15, comprising using the established relationship between the first and second parameters at a matched relationship to derive values of the second parameter as a function of depth and azimuth, and using the further relationship to obtain a three dimensional distribution of the second parameter based on the derived values of the second parameter as a function of depth and azimuth.

19. A method as claimed in claim 14, further comprising establishing the relationship in compliance with values of at least one auxiliary parameter.

20. A method as claimed in claim 19, wherein the obtained values of the auxiliary parameter are measured indicators of the formation properties.

21. A method as claimed in claim 19, wherein the obtained values of the auxiliary parameter are qualitative indicators of the formation properties.

22. A method as claimed in claim 14, wherein the obtained values of the second parameter are measured indicators of the formation properties.

23. A method as claimed in claim 14, wherein the obtained values of the second parameter are qualitative indicators of the formation properties.

24. A method as claimed in claim 14, comprising applying the established relationship by means of a neural network.

* * * * *